United States Patent [19]
Wilcox et al.

[11] Patent Number: 6,116,277
[45] Date of Patent: Sep. 12, 2000

[54] FARM COUPLING

[75] Inventors: Wayne Wilcox, Waterford; Douglas F. Hopson, Union City, both of Pa.

[73] Assignee: Snap-Tite Technologies, Inc., Wilmington, Del.

[21] Appl. No.: 09/186,594

[22] Filed: Nov. 5, 1998

[51] Int. Cl.[7] .................................................... F16L 37/28
[52] U.S. Cl. ...................................... 137/614.02; 137/614
[58] Field of Search .............................. 137/614.02, 614, 137/614.04, 614.05; 251/149.6, 149.1

[56] References Cited

U.S. PATENT DOCUMENTS

| | | |
|---|---|---|
| 3,570,543 | 3/1971 | Ekman ............................. 137/614.04 |
| 3,730,221 | 5/1973 | Vik . |
| 3,791,411 | 2/1974 | Bogeskov et al. ....................... 137/614 |
| 4,077,433 | 3/1978 | Maldays . |
| 4,249,572 | 2/1981 | Shindelar et al. . |
| 4,303,098 | 12/1981 | Shindelar . |
| 4,598,896 | 7/1986 | Maldas . |
| 4,881,573 | 11/1989 | Durant . |
| 5,730,185 | 3/1998 | Wilkins . |
| 5,918,633 | 7/1999 | Zeiber ..................................... 137/614 |
| 5,937,899 | 8/1999 | Zieber . |

*Primary Examiner*—Gregory L. Huson
*Assistant Examiner*—Joanne Y. Kim
*Attorney, Agent, or Firm*—Woodling, Krost and Rust

[57] ABSTRACT

A coupling that is useable on farm implements is disclosed. A metal to metal vent valve is employed in the female half of the coupling which constantly vents the supply port to the vent port when the female half is disconnected or partially disconnected from the male half. Steps in the bore of the female body permit easier disconnection because the ball valve is not depressed thus lowering disconnection faces. When the male half is being coupled with the female half the female half is vented thus making coupling easy.

18 Claims, 10 Drawing Sheets

FARM COUPLING

FIELD OF THE INVENTION

The invention disclosed herein relates to couplings used on agricultural implements, namely, tractors. Other usages in addition to agricultural uses are envisioned. The female half of the coupling is typically mounted on the tractor. The female half of the coupling mates with a male half and fluid flows therethrough to power auxiliary equipment. The male half of the coupling is connected to a hose or other conduit which supplies auxiliary equipment. This invention is directed toward the enablement of easy coupling and uncoupling of the male and female halves. Both processes, coupling and uncoupling, occur because the vent valve of the instant invention relieves the internal pressure on the female valve. The instant invention provides for venting of the female half of the coupling while it is disconnected from the male half of the coupling or while it is in the process of being disconnected from the male half of the coupling. Easy uncoupling, with very little spillage occurs because the male valve closes against an unpressurized female valve.

BACKGROUND OF THE INVENTION

U.S. Pat. No. 4,077,433 to Maldavs illustrates a piston valve arrangement with a passageway through the valve to assist in assuring that the male ball valve remains open in high flow conditions from the male to the female. U.S. Pat. No. 4,881,573 to Durant illustrates a coupler having two poppet valves. The first poppet engages a ball check valve formed in the male coupling and the second poppet is actuated by a manually operated cam. A passageway exists in the piston to allow fluid to be vented or to pressurize the female valve.

U.S. Pat. No. 4,598,896 to Maldavs illustrates a coupler having a spool and a port within the spool. An annular seal is fixedly positioned about the port in the spool. The spool is slidable with respect to the seal which enables pressure to be relieved in the female during coupling and uncoupling with the male. U.S. Pat. No. 4,303,098 to Shindelar discloses a coupler having a female half which includes a female valve having an elongated stem for engaging the male half. The female half of the coupling is vented by a pivotable cam which moves the inner member of the female half to release its locking means and then opens a poppet valve to open the outlet port.

U.S. Pat. No. 4,249,572 to Shindelar et al. discloses a female half which is self-relieving. The female half includes dual poppet valves which are linked together. One of the poppet valves vents the female half of the coupling when the male and female valves are disengaged and uncoupled.

Application Ser. No. 09/037,461 filed by applicant Dennis Zeiber and assigned to Snap-Tite Technologies, Inc., provides a male half of the coupling which pushes the inner body of the pressurized female half of the coupling (which includes a pressurized chamber between a piston and a relief valve positioning member) causing the positioning member to be displaced in a leftward or rearward direction which causes the venting of the female member. The male half of the coupling in application Ser. No. 09/037,461 pulls the inner body of the female half of the coupling rightwardly or forwardly which causes the venting of the female member. The venting occurs when the male and female halves of the coupling are connected or disconnected.

U.S. Pat. No. 5,730,185 to Wilkins et al. discloses a coupling wherein certain positions of the adaptor allow the venting of the dispenser half and the receptacle half. Venting is prohibited by the movement of seals relative to ports and passageways.

U.S. Pat. No. 3,730,221 to Vik provides an exterior vent valve.

None of the related art provides for a metal to metal seal as does the instant invention. Nor does any of the related art provide for a vent comprising a piston having a ball seat and a ball. Nor does any of the related art provide for a piston and a ball vent operable in combination with a pressure source and a stepped bore. None of the related art provides for venting the female half of the coupling continuously when it is separated from the male half of the coupling. Nor does any of the related art provide for low separation force when withdrawing the male from the female. The female valve of the instant invention vents when the relief valve positioning member positions the relief valve in a place within the bore of the body of the female half of the coupler so as to permit room for the ball to lift off its seat upon the application of pressure to the interior of the female half of the coupling.

SUMMARY OF THE INVENTION

The present invention is a coupling comprising a male half and a female half. The female half includes a body having a stepped bore, an inner body member, a relief valve positioning member, a pressure supply port and a vent port. The relief valve positioning member is a affixed to the inner body member. The inner body member and the relief valve positioning member are movable in the stepped bore of the body. The relief valve positioning member has a first and a second position.

The relief valve positioning member includes a relief valve comprising a piston, a ball, an interior ball housing, and a spring urging the piston into engagement with the ball when the relief valve positioning member is in its first position. When the relief valve positioning member is in its first position the ball engages a portion of the stepped bore which has a relatively small diameter. This keeps the ball seated against the seat on the piston and prohibits venting.

The spring of the relief valve positioning member urges the piston into engagement with the interior ball housing when the relief valve positioning member is in its second position. With pressure applied to the female half of the coupling, the ball will lift off the seat of the piston and be forced into a relatively large diameter portion of the stepped bore. When the relief valve positioning member is in its second position the ball moves radially outwardly of the interior ball housing. The housing is hexagonally shaped and permits flow through passageways formed between the ball and the housing when pressure is applied to the female half and when the relief valve positioning member is in its second position.

The piston and the ball are metal. The piston includes a metal seat. The metal ball and the metal seat form a metal to metal seal between the ball and the seat when the relief valve positioning member is in its first position.

The female half of the coupling continuously vents when its is disconnected from the male half of a coupling. When the female half of the coupling is disconnected from the male half the relief valve positioning member is in its second position. The coupling is easily separated because the metal ball valve is simply pushed off its seat as the relief valve positioning member is moved to its second position. When the relief valve positioning member is in its second position the metal ball has room to move radially outwardly off its seat and this permits fluid to flow by the ball valve and between the interior housing and around the exterior housing and out the vent.

It is an object of the present invention to provide a coupling which is easily separated although pressure may be supplied to the female half of the coupling by way of a service pressure port.

It is an object of the present invention to provide a coupling whereby a pressurized male half may be connected to a depressurized female half. The male half of the coupling is typically pressurized as the pressure is generated by fluid trapped between the male half of the coupling and the implement in the field. For instance, the operator may disconnect the male half of the coupling from the female half of the coupling which is located on a tractor. The male half of the coupling is connected to a hose which is connected to an implement which is driven under the force of a hydraulic pump mounted on the tractor. Frequently, while disconnected, the heat from the sun and the ambient air is transmitted to the fluid which is trapped in the line leading from the male half of the coupling to the implement.

It is a further object of the present invention to provide a coupling whose female portion thereof includes a relief valve positioning member comprised of an exterior housing, an interior housing, a piston, a ball, and a spring.

It is a further object of the present invention to provide a coupling whose female portion thereof includes a relief valve positioning member which includes a vent valve therein.

It is a further object of the present invention to provide a coupling whose female portion thereof includes a relief valve positioning member which is positioned by an inner body member.

It is a further object of the present invention to provide a coupling which includes locking means which interact with the inner body member of the female coupling.

It is a further object of the present invention to provide a coupling having a vent mechanism movable with an inner body member.

It is a further object of the present invention to provide a coupling whose female half continuously vents pressure from a service port to a vent port when the female half is disconnected from the male half.

It is further object of the present invention to provide a coupling having a service port, a vent port, a male half, and a passageway interconnecting the service port and the male half. The coupling further includes a vent valve which, under certain conditions, is a metal to metal seal and prohibits venting of the female half.

It is a further object of the present invention to provide a coupling which includes a vent valve which comprises a hexagonal interior housing and a ball residing in the interior housing which seats on a valve seat on a metal piston.

It is an object of the present invention to provide a coupling which may be used on agricultural implements. Typically, the female half of the coupling is mounted on a tractor and pressurized hydraulic fluid is supplied thereto. The female coupling includes an inlet port, sometimes referred to herein as a service port, and an outlet port, sometimes referred to herein as a vent port. The inlet port is connected to a pressure source and the outlet port is connected to a sump or reservoir for recycling back to a pump. The female half of the coupling is capable of being joined with the male half of the coupling. The male half of the coupling is typically connected to an implement that does work of some kind. It is an object of the invention to provide a relief mechanism in the female half of the coupling such that the pressure is continuously relieved inside the female half of the coupling when the female half is disconnected from the male half. This enables easy coupling and uncoupling and minimizes any fluid spillage. This enables easy coupling and uncoupling of the male and female despite the fact that the male coupling may have substantial fluid pressure built up in the line to which the male coupling is connected. Additionally, the male half may have full system pressure applied to it and it may be easily connected to the female half of the coupling. The pressure on the male half of the coupling has no effect on the ability to couple.

A better understanding of the invention will be had when reference is made to the Brief Description Of The Drawings, the drawings themselves, the Description Of the Invention, and the Claims.

BRIEF DESCRIPTION OF THE DRAWINGS

FIG. 2 illustrates the relief valve positioning member in the second position.

DESCRIPTION OF THE INVENTION

Figure 1:
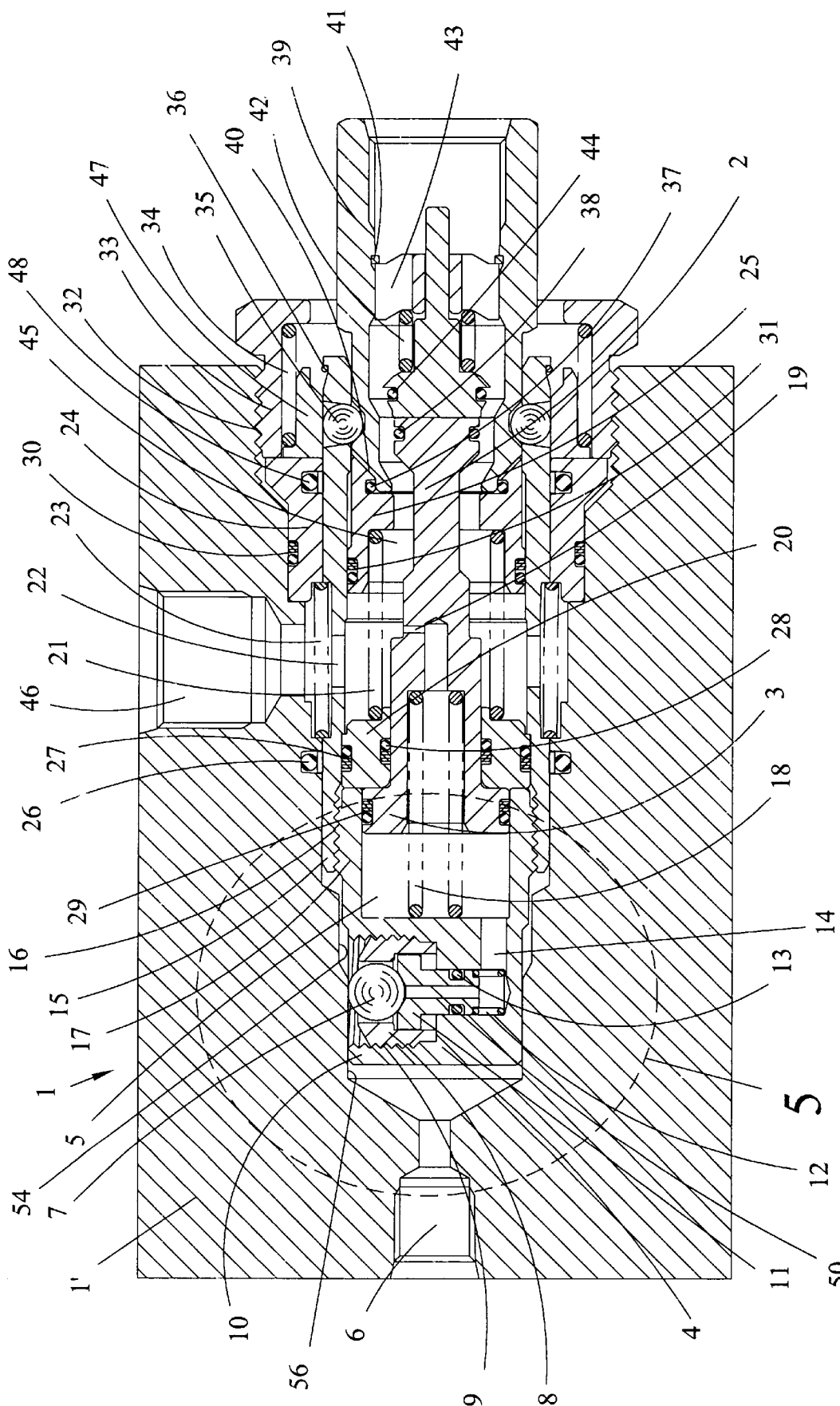
FIG. 1 is a cross-sectional view of the coupling with the male half and the female half of the coupling coupled (connected) together (male and female valves fully opened).

FIG. 1 is a cross-sectional view of the coupling 1 with the male half 61 and the female half 62 of the coupling 1 coupled (connected together). The male half of the coupling is shown alone in FIG. 7 and the female half 62 of the coupling is shown alone in FIG. 8. Body 1' of female half 62 is illustrated in FIG. 1. Female inner body member 15 is slidable relative to outer body 1'.

Figure 8:
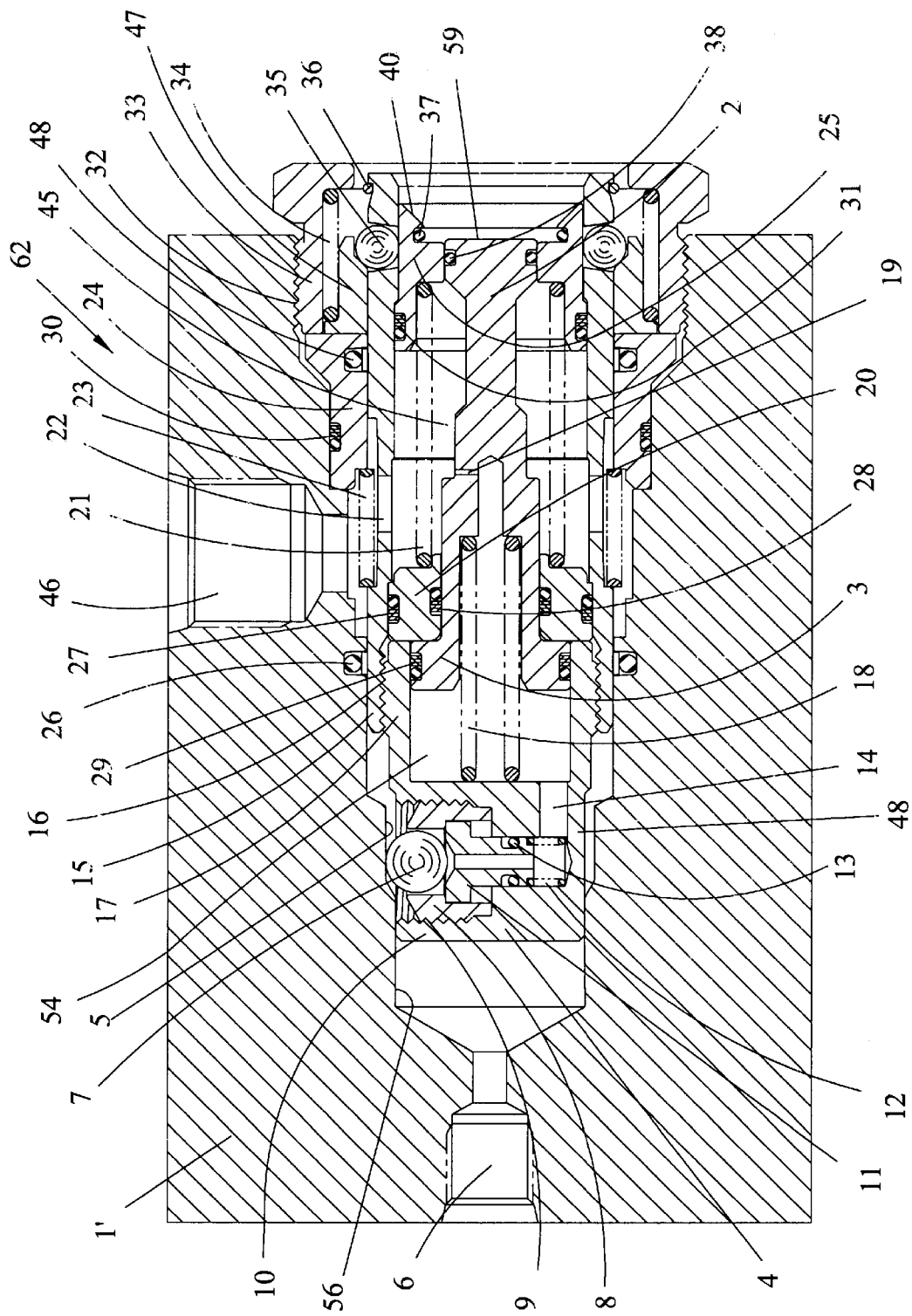
FIG. 8 is a cross-sectional view of the female half of the coupling illustrating the relief valve positioning member in its second position.

Referring to FIGS. 1 and 8, the female member includes a vent port 6 and a pressure supply port 46. The pressure supply port 46 is sometimes referred to herein as the service pressure port or the inlet port. Vent port 6 is sometimes referred to herein as the outlet port. Pressure and fluid flow are supplied to the service pressure port 46.

Figure 5:
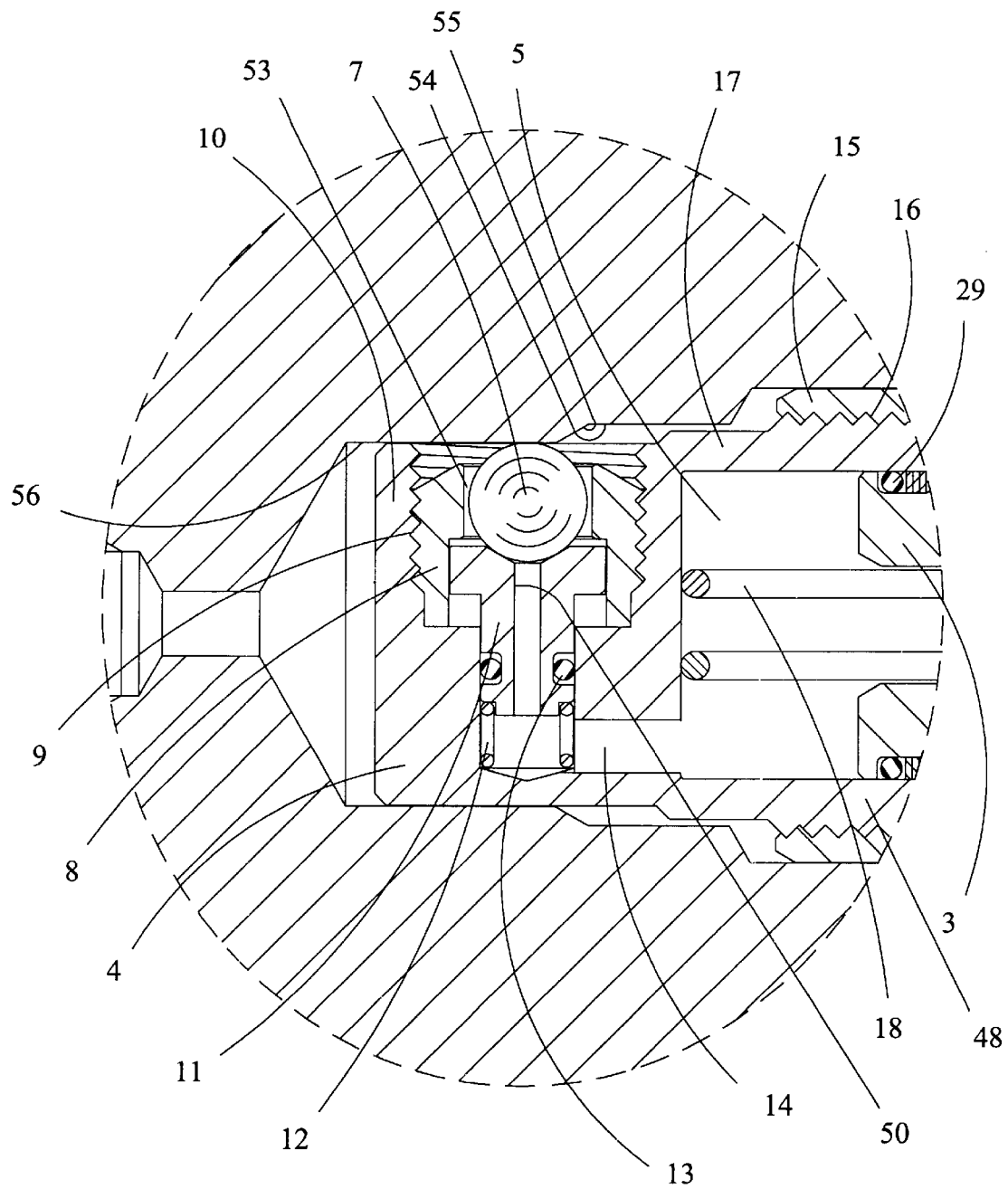
FIG. 5 is an enlarged portion of FIG. 1 illustrating a portion of the relief valve positioning member and the body. The relief valve positioning member is illustrated in its first position.
Figure 10:
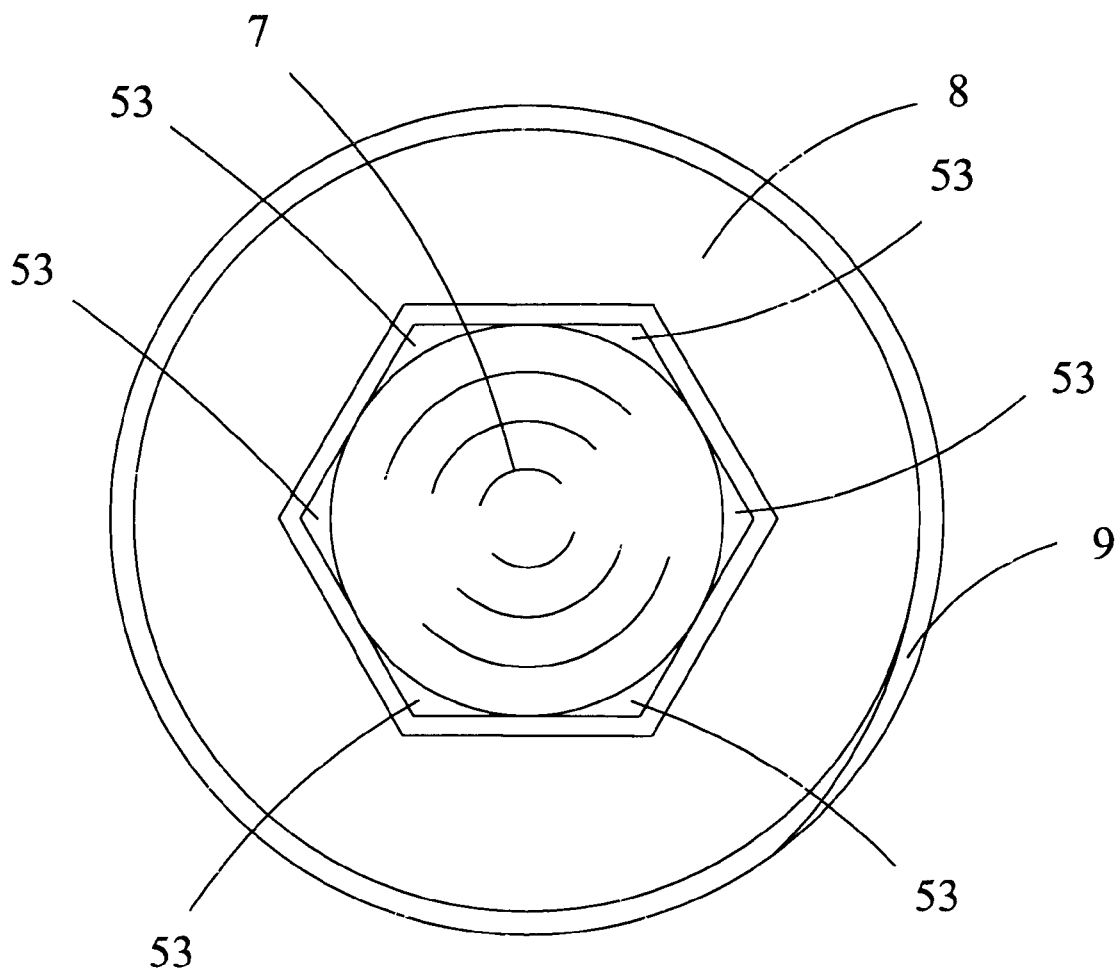
FIG. 10 is a top view of the interior ball housing and the ball.

The relief valve positioning member 4 is affixed to and movable with the inner body member 15. Thread means 16 interconnect the relief valve positioning member 4 to the inner body member 15. The relief valve positioning member 4 further includes an exterior housing 10 to which an interior housing 8 is threaded. The interior housing 8 is further illustrated in FIG. 10. FIG. 10 is a top view of the interior ball housing and the ball Piston 11 is also part of the relief valve positioning member 4 and includes a passageway 50. Seal 13 prevent flow along the interface of the piston and the exterior housing 10 of the relief valve positioning member 4. Spring 12 urges the piston 11 into engagement with the ball 7 as viewed in FIGS. 1 and 5. FIG. 5 is an enlarged portion of FIG. 1 illustrating a portion of the relief valve positioning member 4 and the body 1'. The relief valve positioning member 4 is illustrated in its first position. Female body 1' includes a stepped bore. In other words the female body 1' includes a bore which has multiple diameters. Reference numeral 54 indicates a portion of the bore in housing 1' having a large diameter and reference numeral 56 indicates a portion of the bore having a relatively smaller diameter bore. The difference in the diameter of the bores can be viewed, for example, in FIG. 5. As shown in FIG. 5 the piston 11 is urging the ball 7 against the portion 56 of the bore having a relatively small diameter. It will be noticed from FIG. 5 that there is a transition represented by reference numeral 55 between the portion 54 of the bore having a relatively large diameter and the portion 56 of the bore having a relatively small diameter.

Referring again to FIG. 1, the interior housing 8 is threaded by means of threads 9 to the exterior housing 10. The relief valve positioning member 4 includes a passageway 14 which permits communication with passageway 50 which in turn applies pressure to ball 7 if pressure has been supplied to the interior of the female half of the coupling. Referring still to FIG. 1, if pressure is supplied to service pressure port 46, it passes (i.e., is transmitted) through ports 22 of inner body member 15, through passageway 19 of piston 3 into chamber 5, through passageways 14 and 50 and is applied to ball 7. As shown in FIGS. 1 and 5, ball 7 is sealing against seat 52 on piston 7 prohibiting flow to vent port 6.

Flow and/or pressure is transmitted (as shown in FIG. 1) to the passageway 45 and into the male half of the coupling past spring support 43 and to the implement.

Again referring to FIG. 1, reference numeral 16 indicates the threaded connection between the female inner body member 15 and the cylindrical portion 17 of the relief valve positioning member 4. Reference numeral 5 indicates a piston chamber formed between the piston 3 and the relief valve positioning member 4. Face 57 of male valve 58 engages face 59 of piston 3 of the female half of the coupling. See, FIG. 3. Piston 3 includes an end portion 2 which engages (as shown in FIG. 1) the male valve 58 of the male half of the coupling. Piston 3 also includes passageway 19 which permits communication with the piston chamber 5. Spring 18 is operable between piston 3 and relief valve positioning member 4. Intermediate member 20 is secured to the relief valve positioning member 4 and the inner body member 15 and limits the travel of piston 3 upon pressurization of chamber 5. Spring 21 operates between the intermediate member 20 and the female valve 25.

There are a plurality of ports 22 in the female inner body member 15. Spring 23 is operable between the body 1' and the inner body member 15 and between the inner body member 15 and insert 24. Insert 24 is secured in place by adaptor 33 which is threaded 32 to the body 1'. Seal 26 seals between the body 1' and the female inner body member 15. Seal 48 seals between the insert 24 and the female inner body member 15. Seal 27 seals between the inner body member 15 and the intermediate member 20 and seal 28 seals between the piston 3 and the intermediate member 20. Seal 29 seals between the piston 3 and the relief valve positioning member 4. Seal 30 seals between the body 1' and insert 24. Seal 31 seals between the female valve 25 and the female inner body member 15.

Spring 34 is operable between the adaptor 33 and the locking sleeve 47. Locking balls or locking detents 35 secure the female half and the male half of the coupling together. Snap ring 36 insures that the locking sleeve 47 will not come too far rightwardly when viewing FIG. 1.

Seal 37 seals between the female valve 25 and the male body 39 of the male half 61 of the coupling when the male and the female halves are coupled together. See, FIG. 1.

Referring to FIG. 8 seal 38 seals between the right end of piston 2 and the female valve 25. Still referring to FIG. 8, reference numeral 59 indicates the face of piston 3 and reference numeral 40 indicates the face of the female valve 25.

Figure 7:
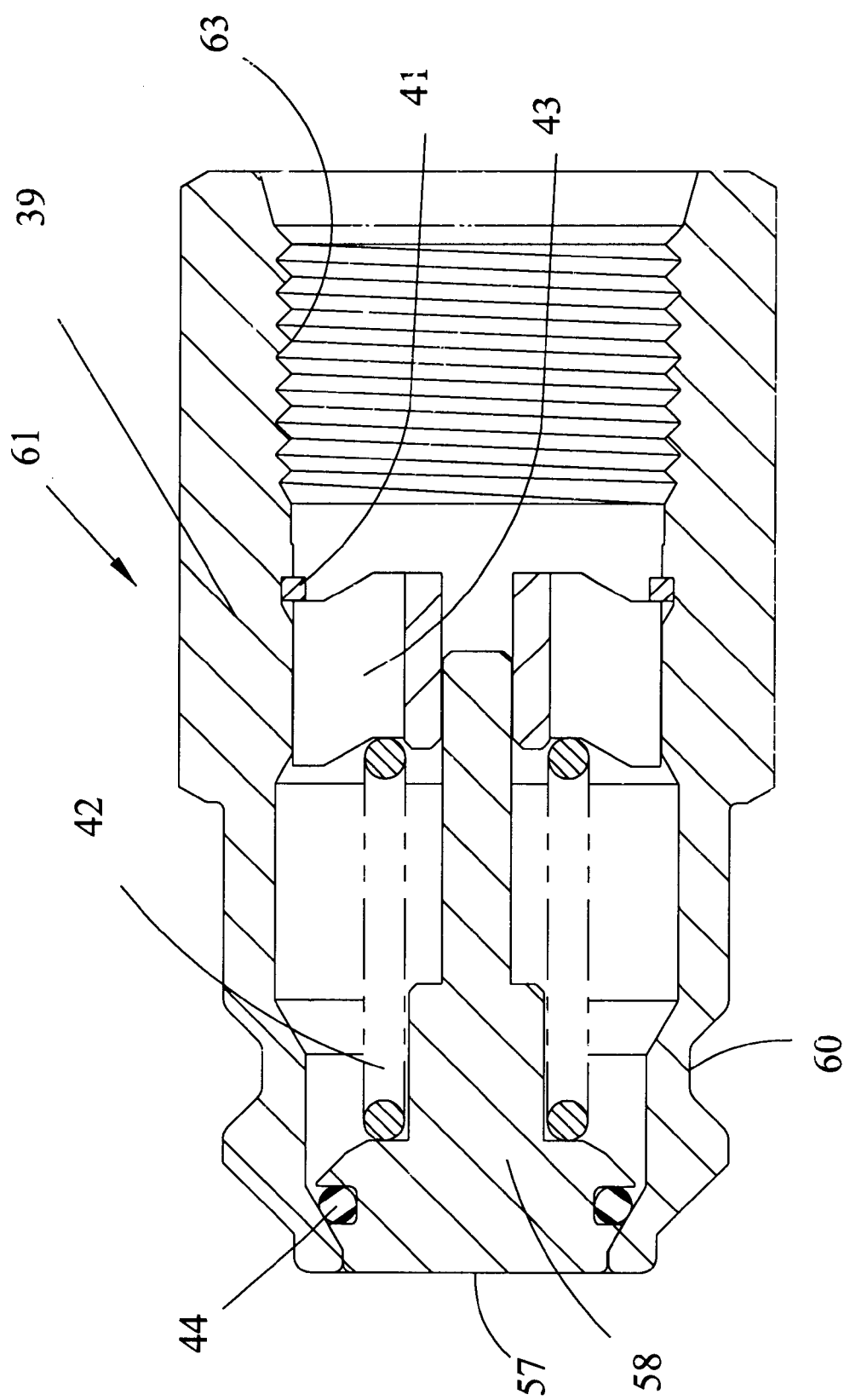
FIG. 7 is a cross-sectional view of the male half of the coupling.

Referring to FIG. 7, an illustration of the male half 61 of the coupling, reference numeral 39 indicates the body of the male half 61 of the coupling. The male half also includes a male valve 58. Reference numeral 57 is the face of the male valve 58. Reference numeral 63 indicates threads on the male half 61 of the coupling for use in connecting, for example, to an implement.

Notch 60 is in the body 39 of the male half of the coupling and it engages with the detent members 35 when the male half and the female half of the coupling are connected. Male half 61 further includes a spring support and valve guide 43 which is restrained by snap ring 41. Spring 42 is operable between the spring guide 43 and the male valve 58. Seal 44 seals between the male valve 58 and the body 39 of the male half 61 of the coupling.

Figure 2:
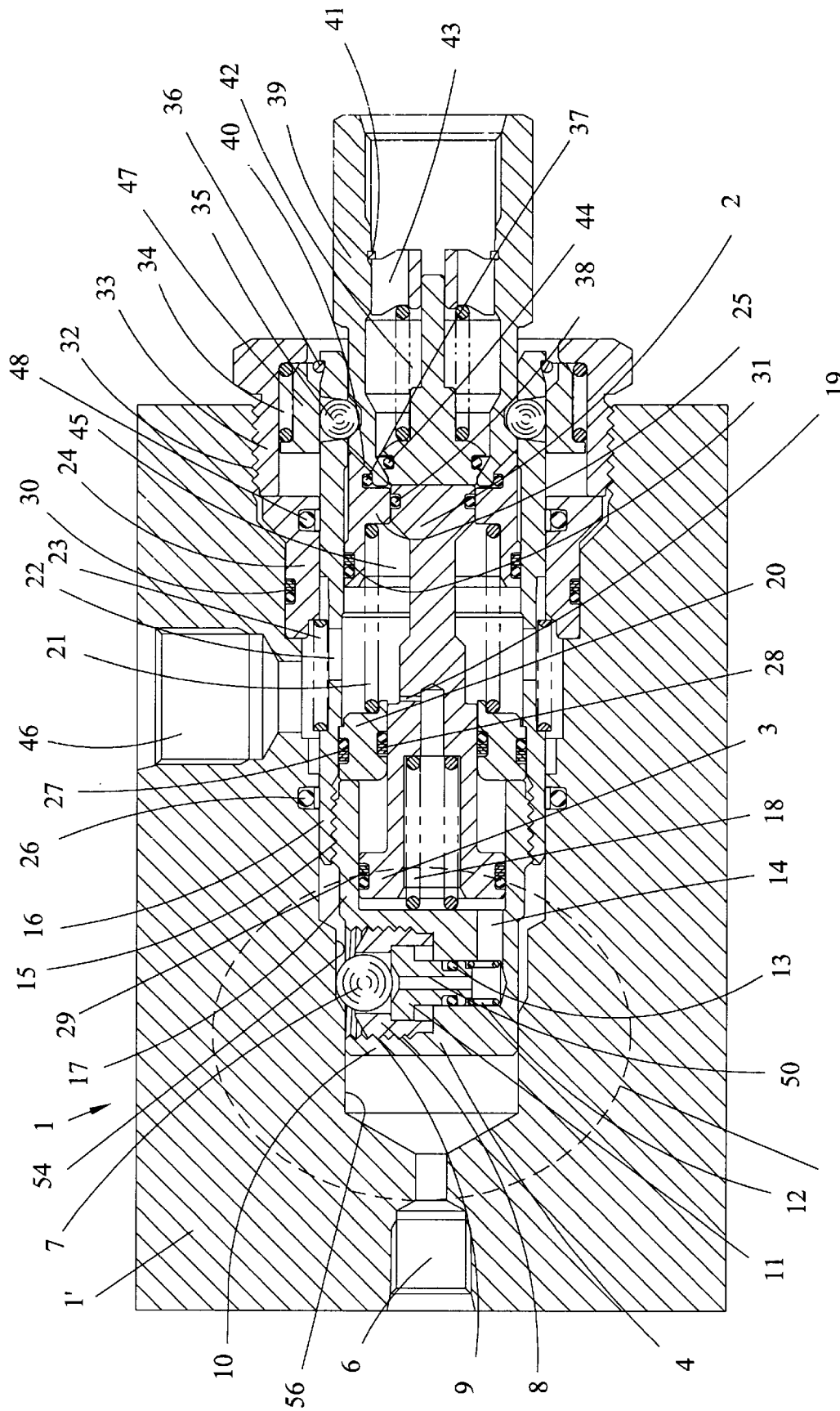
FIG. 2 is a cross-sectional view of the coupling with the male half in the process of being uncoupled from the female half.

Referring to FIG. 2 which is a cross-sectional view of the coupling with the male half 61 in the process of being uncoupled from the female half. In FIG. 2 it can be seen that the relief valve positioning member 4 has been pulled rightwardly under the influence of the male half of the coupling. As force is exerted to pull the male half of the coupling rightwardly, inner body member 15 is also pulled rightwardly due to the engagement of detents 35. Consequently, the relief valve positioning mechanism 4 which is affixed to the inner body member 15 is also pulled rightwardly which positions the ball 7 and piston in the portion 54 of the bore which has a sufficiently large diameter to permit venting of pressure from within the female half of the coupling. This permits the metal ball 7 to raise off of seat 52. See FIG. 2.

Figure 6:
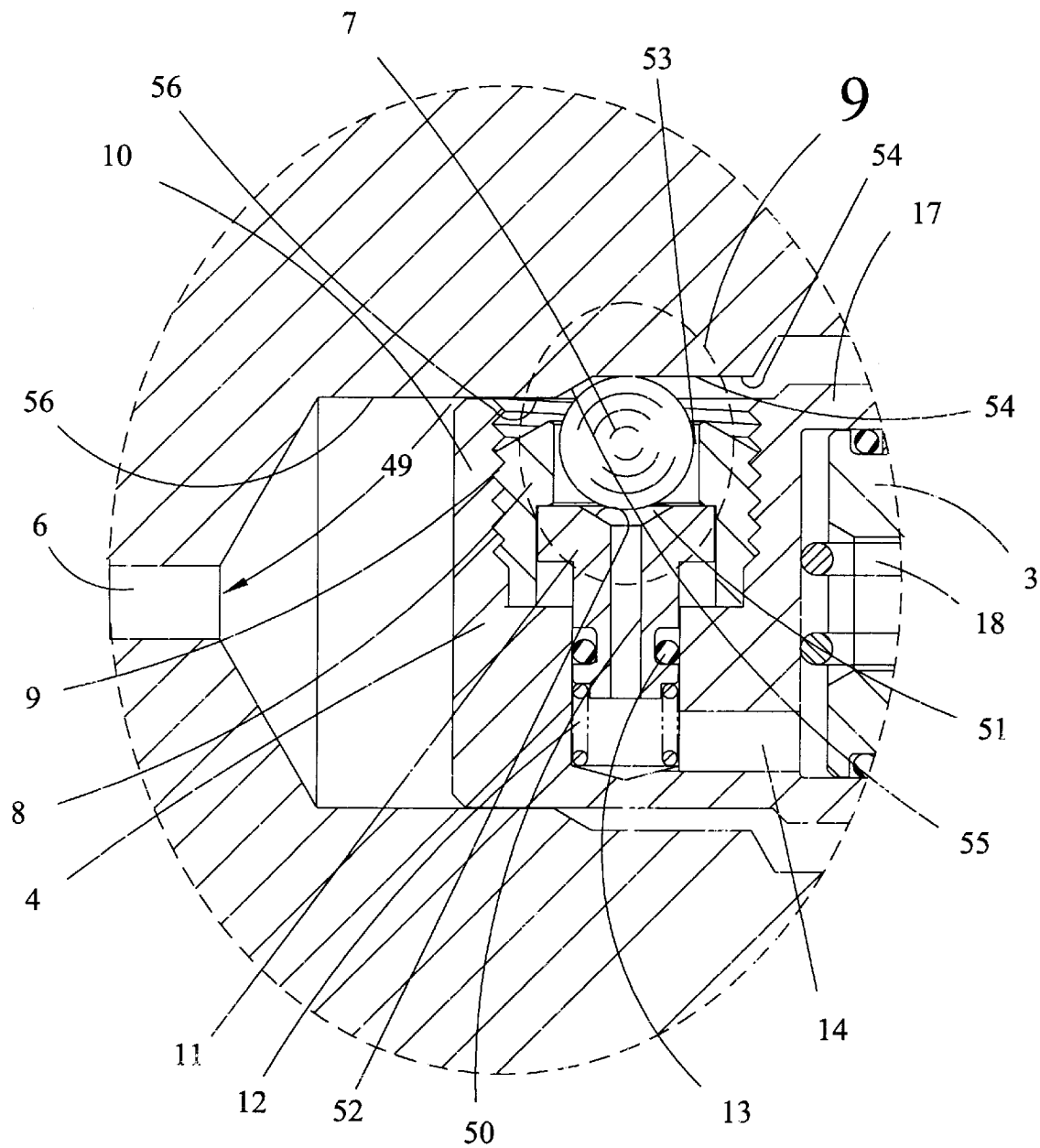
FIG. 6 is an enlarged portion of FIG. 2 illustrating a portion of the relief valve positioning member and the body. The relief valve positioning member is illustrated in its second position.
Figure 9:
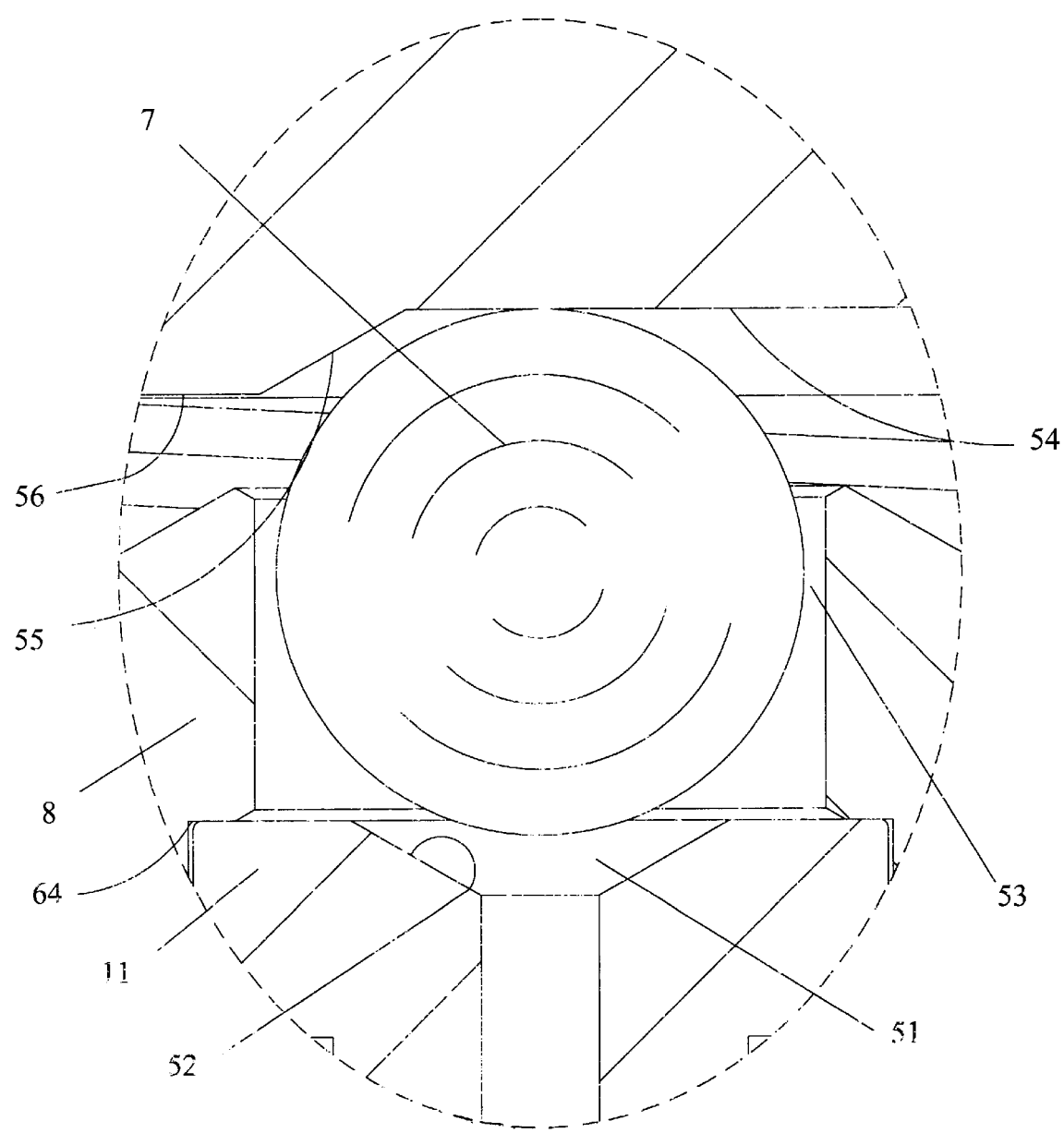
FIG. 9 is an enlargement of a portion of FIG. 6 illustrating the ball valve off the seat of the piston.

FIG. 6 is an enlarged portion of FIG. 2 illustrating a portion of the relief valve positioning member 4 and the body 1'. The relief valve positioning member is illustrated in its second position in FIGS. 2 and 6. FIG. 9 is an enlargement of a portion of a portion of FIG. 6 illustrating the ball valve 7 off seat 52 of the piston 11. As shown in FIGS. 2, 6 and 9 fluid is being supplied along passageway 14 to passageway 50 in piston 11 and through passageways 51 and 53. See, FIG. 10. FIG. 10 illustrates the hexagonal shape of the interior housing 8. Flow only occurs through passageways 53 when the ball 7 is off its seat 52. In the preferred embodiment ball 7, piston 11 and seat 52 are metal.

Referring to FIG. 6, reference numeral 49 indicates the flow of fluid toward the vent 6 in the instance when the ball 7 is permitted to rise off its seat 52. Fluid will flow between the interface of exterior housing 10 and portion 56 of the bore in body 1'. In other words, flow occurs as indicated by reference numeral 49 when the relief valve positioning member 4 is in its second position as shown in FIGS. 2, 6 and 9. The direction of the flow is around exterior housing 10. Reference numeral 51 indicates a gap between the seat 52 of piston 11 and the ball 7. Piston 11 abuts the shoulder 64 of interior housing 8 in FIGS. 2, 6 and 9. See, in particular FIG. 9. These drawings show the structure and position of the elements when venting occurs.

Figure 3:
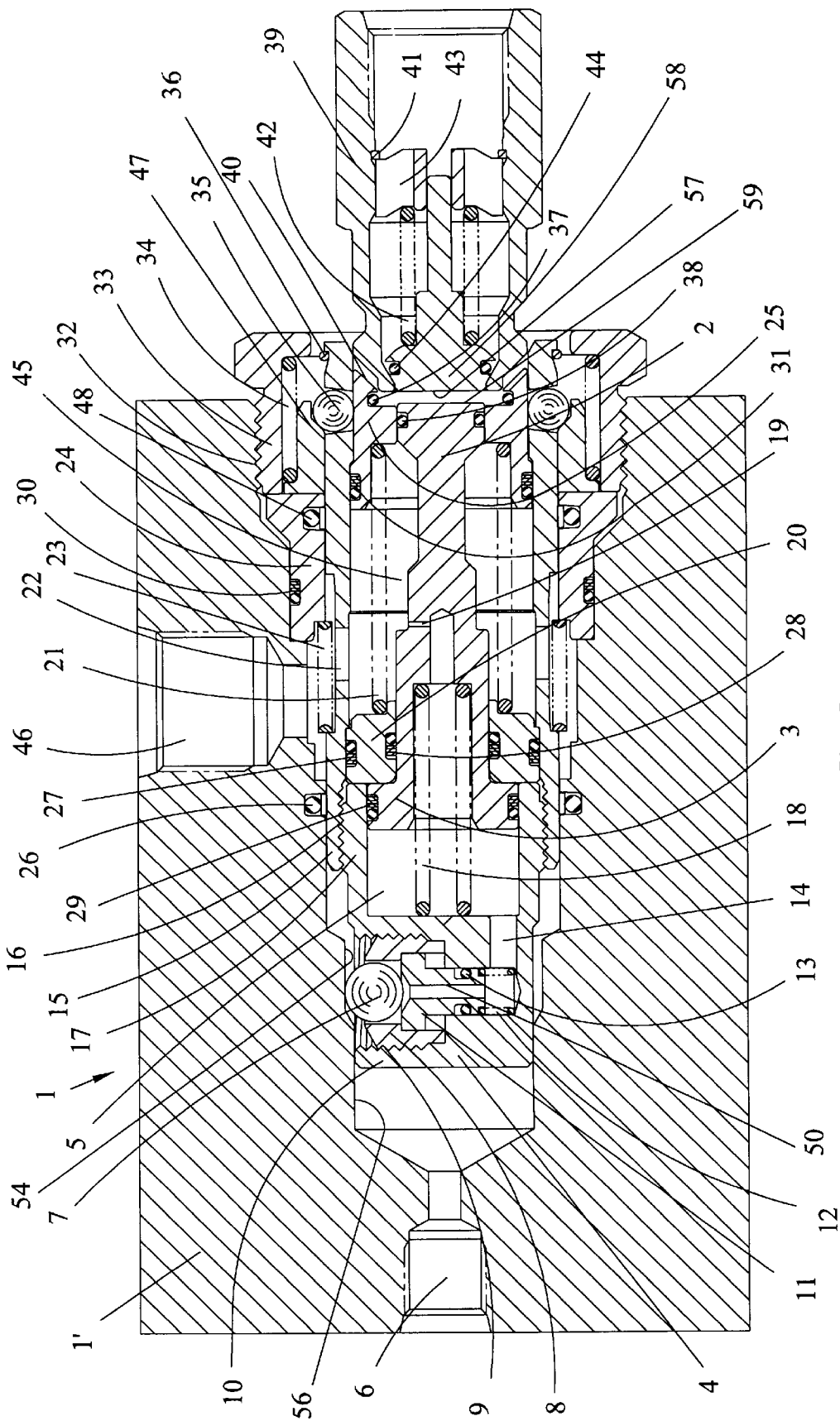
FIG. 3 is a cross-sectional view of the coupling uncoupled (fully disconnected).
Figure 4:
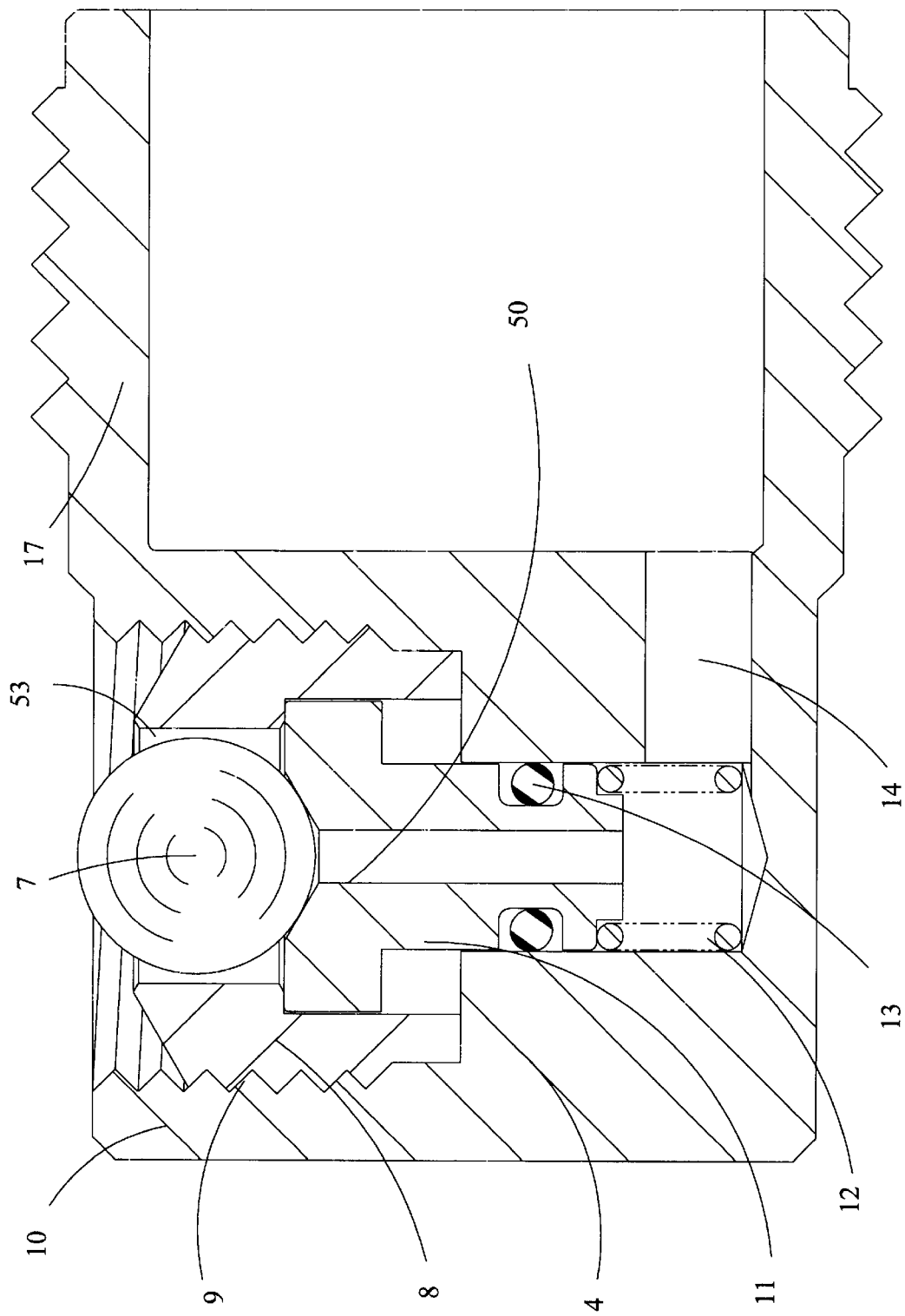
FIG. 4 is an enlarged cross-sectional view of the relief valve positioning member.

FIG. 3 is a cross-sectional view of the coupling in the uncoupled condition, for example, fully disconnected. FIG. 4 is an enlarged cross-sectional view of the relief valve positioning member. FIG. 4 is illustrated separated apart from its use in the invention so as to better show the relief valve positioning member. In other words, the relief valve positioning member 4 as shown in FIG. 4 is not shown in an operational sense.

It will be understood by those skilled in the art that the foregoing description of the invention is by way of example only and it is not meant to impart any limitation on the scope of the claims which follow.

I claim:

1. A female coupling half comprising: a body; said body includes a pressure supply port and a vent port; a relief valve positioning member; a movable inner body member; said relief valve positioning member includes a vent valve; and said vent valve includes a piston and a ball.

2. A female coupling half as claimed in claim 1 wherein said relief valve positioning member is affixed to said inner body member.

3. A female coupling half as claimed in claim 2 wherein said vent valve permits communication to said vent port when said inner body member is in said second position.

4. A female coupling half as claimed in claim 2 wherein said vent valve does not permit communication to said vent port when said inner body member is in said first position.

5. A female coupling half as claimed in claim 1 wherein said piston and said ball are metal.

6. A female coupling half as claimed in claim 1 wherein said piston includes a metal seat and wherein said ball is metal.

7. A coupling comprising: a male half and a female half; and, said female half includes: a movable inner body member, a relief valve positioning member, a pressure supply port and a vent port; said relief valve positioning member includes a vent valve, and, said vent valve includes a piston and a ball.

8. A coupling as claimed in claim 7 wherein said female body includes a stepped bore having a first internal diameter and a second internal diameter; said relief valve positioning member includes a seat on said piston; and, said ball seals against said seat on said piston when said ball engages said first internal diameter.

9. A coupling as claimed in claim 8 wherein said relief valve positioning member includes an interior ball housing.

10. A coupling as claimed in claim 9 wherein said interior ball housing includes a hexagonal aperture for housing said ball.

11. A coupling as claimed in claim 10 wherein said relief valve positioning member further includes an exterior housing and a spring residing between said exterior housing and said piston.

12. A coupling as claimed in claim 11 wherein said exterior housing of said relief valve positioning member includes a passageway subjected to pressure and said piston includes a passageway in communication with said passageway of said exterior housing; and, together said passageways communicate pressure to said ball.

13. A female coupling half comprising: a body; said body includes a pressure supply port and a vent port; and, a relief valve positioning member comprising: an exterior housing having a passageway in communication with said pressure supply port, an interior housing having an aperture, a piston having a ball seat and a passageway in communication with said passageway of said exterior housing, and, a ball residing in said aperture of said interior housing.

14. A female coupling half as claimed in claim 13 wherein said body includes a stepped bore which unseats said ball from said ball seat of said piston when said relief valve positioning member resides in a bore of sufficient diameter.

15. A coupling comprising: a male half and a female half; said female half includes a body having a stepped bore, an inner body member, a relief valve positioning member, a pressure supply port and a vent port; said relief valve positioning member being affixed to said inner body member; said inner body member and said relief valve positioning member being movable in said stepped bore of said body; said relief valve positioning member having a first position and a second position; and, said relief valve positioning member includes a relief valve comprising a piston, a ball, a ball housing, and a spring urging said piston into engagement with said ball when said relief valve positioning member is in its said first position and said spring urging said piston into engagement with said ball housing when said relief valve positioning member is in its said second position.

16. A coupling as claimed in claim 15 wherein said piston includes a metal seat and said ball is metal forming a metal to metal seal between said ball and said seat when said relief valve positioning member is in its said first position.

17. A female coupling half comprising a body, a supply port, a vent port, and means for venting said supply port to said vent port when said female coupling half is uncoupled.

18. A female coupling half which continuously vents when not connected to a male coupling half comprising: a body, a supply port, a vent port, an inner body member, a relief valve positioning member; said inner body member movable with respect to said body; said relief valve positioning member affixed to said inner body member and movable therewith to a first and second position; and, said relief valve positioning member includes a vent valve which continuously vents said female half of said coupling when said relief valve positioning member is in said second position.

* * * * *